(12) United States Patent
Kearney

(10) Patent No.: US 11,846,817 B2
(45) Date of Patent: Dec. 19, 2023

(54) ARMORED COUPLING SYSTEM FOR OPTICAL FIBERS

(71) Applicant: DISYS, LLC, Libertyville, IL (US)

(72) Inventor: Channing Kearney, Indianapolis, IN (US)

(73) Assignee: DISYS, LLC, Libertyville, IL (US)

( * ) Notice: Subject to any disclaimer, the term of this patent is extended or adjusted under 35 U.S.C. 154(b) by 0 days.

(21) Appl. No.: 17/719,903

(22) Filed: Apr. 13, 2022

(65) Prior Publication Data

US 2022/0334330 A1 Oct. 20, 2022

Related U.S. Application Data

(60) Provisional application No. 63/174,611, filed on Apr. 14, 2021.

(51) Int. Cl.
G02B 6/44 (2006.01)

(52) U.S. Cl.
CPC ........... *G02B 6/443* (2013.01); *G02B 6/4461* (2013.01)

(58) Field of Classification Search
CPC .... E21B 17/206; G02B 6/4461; G02B 6/4478
See application file for complete search history.

(56) References Cited

U.S. PATENT DOCUMENTS

| 4,396,797 A * | 8/1983 | Sakuragi | G02B 6/4461 138/120 |
| 5,143,123 A * | 9/1992 | Richards | G02B 6/4461 138/155 |
| 5,473,723 A * | 12/1995 | Stockman | G02B 6/443 385/100 |
| 7,062,143 B1 | 6/2006 | Berens et al. | |
| 7,377,555 B2 | 5/2008 | Smith, III | |
| 7,845,069 B2 | 12/2010 | Franklin et al. | |
| 8,658,900 B2 | 2/2014 | Picard et al. | |

(Continued)

FOREIGN PATENT DOCUMENTS

| CN | 108181690 A | 6/2018 | |
| CN | 108761684 A * | 11/2018 | ............. G02B 6/443 |
| WO | 2020249142 A1 | 12/2020 | |

OTHER PUBLICATIONS

Cable Protector: "https://www.grainger.com/product/14N918?ef_id=EAlalQobChMI_ta10oy47wIVTvbjBx0GMAIGEAQYAiABEgKALPD_BwE:G:s&s_kwci".

(Continued)

*Primary Examiner* — Charlie Y Peng
(74) *Attorney, Agent, or Firm* — Taft Stettinius & Hollister LLP; William Michael Etienne

(57) ABSTRACT

A protective covering system for optical cables includes a plurality of links which may be coupled together to form a two-layer barrier to protect optical fiber positioned with the coupled links. Each link includes a first portion and a wider second portion. The first portion of a first link is insertable in the second portion of a second link such that the first portion of the first link and the second portion of the second link overlap one another radially. The ends of each portion include oppositely extending flanges, at least one of which is temporarily deformable when the first link is inserted into the second link. When the first and second links are secured to one another, the coupled links are free to move axially and to tilt relative to each other.

20 Claims, 10 Drawing Sheets

(56) References Cited

U.S. PATENT DOCUMENTS

| | | | |
|---|---|---|---|
| 9,927,588 B2 | 3/2018 | Blazer et al. | |
| 10,444,454 B2 | 10/2019 | Peterson, III et al. | |
| 10,522,993 B2 | 12/2019 | Henry | |
| 10,598,882 B2 | 3/2020 | Bohler et al. | |
| 10,787,866 B2* | 9/2020 | Thomas | E21B 23/14 |
| 2011/0075979 A1 | 3/2011 | Ma et al. | |
| 2020/0033535 A1* | 1/2020 | Petersen | G02B 6/4471 |

OTHER PUBLICATIONS

Popular Armor Types: "https://www.iewc.com/resources/technical-guide/popular-armor-types"; Technical Guide; Interlocked Armor; Accessed Date: Mar. 16, 2021.

Power Cable: "http://industrial.southwire.com/en/tile/1/cable/1231/"; Accessed Date: Mar. 16, 2021.

* cited by examiner

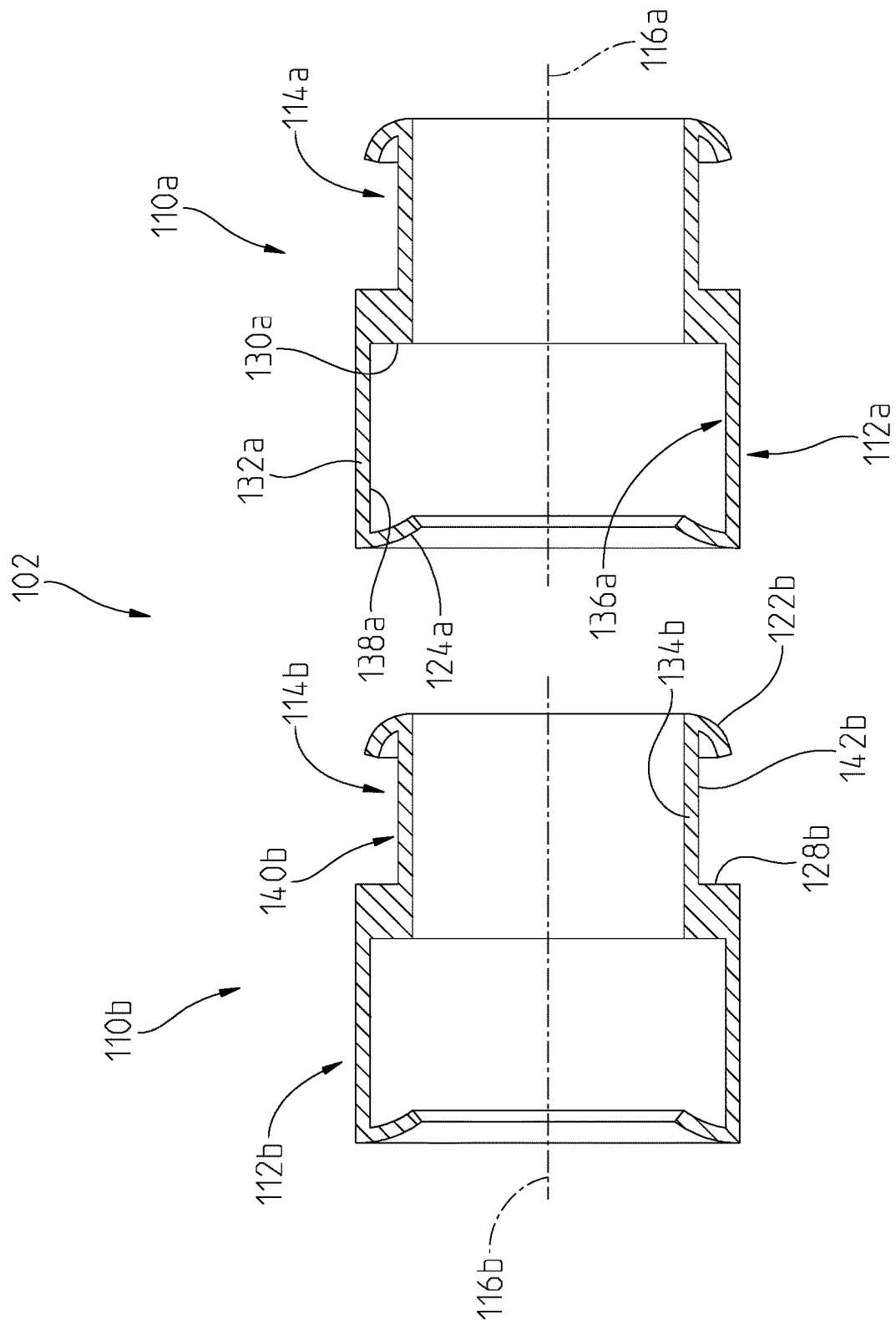

ARMORED COUPLING SYSTEM FOR OPTICAL FIBERS

RELATED APPLICATIONS

This application claims priority to U.S. Provisional Application No. 63/174,611, filed Apr. 14, 2021, the disclosure of which is hereby incorporated by reference in its entirety.

FIELD OF THE DISCLOSURE

The present disclosure relates to protective layers for fiber optic cable, and more particularly, to metal tubing forming a protective layer for optical fibers.

BACKGROUND

Armored fiber optic cables are much stronger and tougher than common cables and are designed to withstand crushing forces, tension and compression forces, and rodent issues. Armored fiber optic cables possess high flexibility and durability, which makes the cables useful in harsh environments or limited space.

Armored fiber optic cable includes several layers to secure and protect the optical fibers positioned within other components of the cable. A plastic outer jacket may provide some protection against rodents, abrasion, and twist; although, at times this protection may be insufficient. A light metal tube between the optic fibers and the outer jacket offers additional protection to the fibers in the center. Synthetic fibers may be placed inside the outer jacket to cover the metal tube.

During the installation of the cable, installers must take into account at least three variables of the armored fiber optic cable system to prevent damage to the inner cable: maximum pull tension, minimum bend radius, and crush loading capacity. The variables are effected by the layers surrounding the inner cable, especially the light metal tube between the optical fibers and the outer jacket.

Generally, there are two types of armored fiber optic cables: interlocking and corrugated, each of which are so named based on the arrangement of light metal tube. Interlocking armor is an armor—often aluminum—that is helically wrapped around the optical fibers and found in indoor and indoor/outdoor cables. It offers durability associated with high crush loading capacity. Corrugated armor is a coated metal tape, generally steel, folded around the optical fibers longitudinally. It is found in outdoor cables and offers extra mechanical and rodent protection.

With the conventional light metal tubes, the cables are still often damaged by rodents, improper installation, and other bending or crushing forces. Therefore, what is needed is an improved system that protects the optical fibers. Specifically, it would be advantageous to replace the interlocking or corrugated light metal tube with armor links that, when coupled together, for a chain to provide improved protection to the optical fibers. Further, the armor links described herein may provide improved maximum pull tension, minimum bend radius, and crush loading capacity, which reduces the likelihood of damaging the optical fibers during installation of the cable.

SUMMARY

In an illustrative embodiment, a protective covering system for an optical fiber comprise: a plurality of links that are coupleable together, wherein each link includes: a first cylindrical portion defined about a central axis, the first cylindrical portion including an receiving end of the link; a second cylindrical portion defined about the central axis, the second cylindrical portion including an insertion end of the link, wherein the second cylindrical portion has a lesser diameter than the first cylindrical portion; a base extending radially outwardly relative to the central axis from the second cylindrical portion to the first cylindrical portion, the base including an outer wall facing toward the insertion end of the link and an inner wall facing toward the receiving end of the link; a rear flange defined at the receiving end of the link and extending inwardly toward the central axis; a front flange defined at the insertion end of the link and extending outwardly away from the central axis; wherein, when adjacent links, including a forward link and a rearward link, of the plurality of links are coupled together: (i) the rear flange of the forward link is positioned axially between the outer wall of the rearward link and the front flange of the rearward link, and (ii) the front flange of the rearward link is positioned axially between the inner wall of the forward link and the rear flange of the forward link.

In some embodiments, when the adjacent links are coupled to one another, the adjacent links are movable axially relative to one another. In some embodiments, when the adjacent links are coupled to one another, the adjacent links are each rotatable about their respective central axes relative to one another. In some embodiments, when the adjacent links are coupled to one another, the rear flange of the forward link is movable axially between the outer wall of the rearward link and the front flange of the rearward link. In some embodiments, when the adjacent links are coupled to one another, the front flange of the rearward link is movable axially between the inner wall of the forward link and the rear flange of the forward link.

In some embodiments, when viewed in cross section through the central axis the front flange and the rear flange of each link have the same shape. In some embodiments, the front flange of each link includes a first surface facing the base. In some embodiments, the first surface of extends perpendicularly relative to the central axis of the link. In some embodiments, the front flange of each link is tapered such that a second surface of the front flange extends away from the first surface toward the central axis. In some embodiments, the front flange of each link includes a third surface extending between the first surface and second surface parallel to the central axis.

In some embodiments, the rear flange of each link includes a fourth surface facing the base and extending perpendicularly relative to the central axis of the link; the rear flange of each link is tapered such that a fifth surface of the rear flange extends away from the first surface and away from the central axis; the rear flange of each link includes a sixth surface extending between the fourth surface and fifth surface parallel to the central axis; and the sixth surface is nearer to the central axis than is the third surface.

In some embodiments, when the adjacent links are coupled to one another, the adjacent links are movable relative to one another from a first position in which their respective central axes are aligned to a second position in which their respective central axes are unaligned. In some embodiments, the first cylindrical portion of each link includes a plurality of u-shaped cut-outs defined therein; wherein each u-shaped cut-out opens toward the insertion end of the link.

In another illustrative embodiment, a protective covering system for an optical fiber comprising: a plurality of links that are coupleable together, wherein each link includes: a first cylindrical portion having an inner surface defined about a central axis, the first cylindrical portion including a receiving end of the link; a second cylindrical portion having an outer surface defined about the central axis, the second cylindrical portion including an insertion end of the link, wherein the second cylindrical portion is has a lesser diameter than the first cylindrical portion; an outer wall facing toward the insertion end of the link; an inner wall opposite the outer wall facing toward the receiving end of the link; a rear flange defined at the receiving end of the link and extending inwardly toward the central axis; a front flange defined at the insertion end of the link and extending outwardly away from the central axis; wherein, when adjacent links, including a forward link and a rearward link of the plurality of links, are coupled together: (i) the rear flange of the forward link is positioned in a cavity formed by the outer wall of the rearward link, the front flange of the rearward link, and the outer surface of the first cylindrical portion of the rearward link, and (ii) the front flange of the rearward link is positioned in a cavity formed between the inner wall of the forward link, the rear flange of the forward link, and the inner surface of the second cylindrical portion of the forward link.

In some embodiments, when the adjacent links are coupled to one another, the adjacent links are movable axially relative to one another. In some embodiments, the front flange of each link includes: a first surface facing the outer wall of the link, and a second surface extending away from the first surface and simultaneously toward the central axis of the link; and the rear flange of each link includes a third surface facing the inner wall of the link, and a fourth surface extending away from the third surface and simultaneously away from the central axis. In some embodiments, the first surface and third surface are perpendicular to the central axis; and the second surface and fourth surface are neither parallel nor perpendicular to the central axis. In some embodiments, the insertion end of each link includes a first head wall parallel to the first surface; the receiving end of each link includes a second head wall parallel to the third surface; and the first head wall of the rearward link is configured to abut the inner wall of the forward link during axially movement of the adjacent links relative to one another; and the second head wall of the forward link is configured to abut the outer wall of the rearward link during axially movement of the adjacent links relative to one another.

In another illustrative embodiment, a method of coupling adjacent links of a protective covering system for optical cables, comprises: inserting an optical fiber into a plurality of links; inserting a first portion of a rearward link of the plurality of links into a second portion of a forward link of the plurality of links; wherein inserting a first portion of a rearward link into a second portion of a forward link includes urging a front flange of the rearward link into contact with and past a rear flange of a forward link; wherein urging a front flange of the rearward link into contact with and past a rear flange of the forward link includes temporarily deforming at least one of the front flange of the rearward link and the rear flange of the forward link.

In some embodiments, the method further comprises: inserting a first chain of coupled links into a chamber such that an inner space of the second portion of the forward link is accessible; fixing the chain of coupled links in a position within the chamber; sliding a plurality of uncoupled links onto a guide rod such that the rear link is the last link slid onto the guide rod; aligning the plurality of uncoupled links with the chain of coupled links prior to inserting the first portion of the rearward link of the plurality of links into the second portion of the forward link of the plurality of links.

In another illustrative embodiment, a protective covering system for an optical fiber comprises a plurality of links that are coupleable together. Each link includes a first cylindrical portion defined about a central axis. The first cylindrical portion includes an insertion end of the link. Each link further includes a second cylindrical portion defined about the central axis, the second cylindrical portion including a receiving end of the link. The second cylindrical portion is more narrow than the first cylindrical portion. Each link further includes a base extending radially outwardly relative to the central axis between the first cylindrical portion and the second cylindrical portion. The base including an outer wall facing toward the insertion end of the link and an inner wall facing toward the receiving end of the link. Each link further includes a rear flange defined at the receiving end of the link and extending inwardly toward the central axis; a front flange defined at the insertion end of the link and extending outwardly away from the central axis. When adjacent links, including a forward link and a rearward link, of the plurality of links are coupled together: (i) the rear flange of the forward link is positioned axially between the outer wall of the rearward link and the front flange of the rearward link, and (ii) the front flange of the rearward link is positioned axially between the inner wall of the forward link and the rear flange of the forward link.

In some embodiments, when the adjacent links are coupled to one another, the adjacent links are movable axially relative to one another. In some embodiments, when the adjacent links are coupled to one another, the rear flange of the forward link is movable axially between the outer wall of the rearward link and the front flange of the rearward link. In some embodiments, when the adjacent links are coupled to one another, the front flange of the rearward link is movable axially between the inner wall of the forward link and the rear flange of the forward link. In some embodiments, when the adjacent links are coupled to one another, the central axes of the adjacent links are movable relative to one another such that the central axes are unaligned.

In some embodiments, each link of the plurality of links is movable from an uncoupled position to a coupled position; in the uncoupled position, the rearward flange is positioned at a first angle relative to a side wall defining the first cylindrical portion; in the coupled position, the rearward flange is positioned at a second angle relative to the side wall defining the first cylindrical portion; and the second angle is less than the first angle. In some embodiments, each link of the plurality of links is movable from an uncoupled position to a coupled position; in the uncoupled position, the front flange is positioned at a first angle relative to a side wall defining the second cylindrical portion; in the coupled position, the front flange is positioned at a second angle relative to the side wall defining the second cylindrical portion; and the second angle is less than the first angle. In some embodiments, the first and second angles are each less than 90 degrees.

In some embodiments, when the adjacent links are coupled to one another, the adjacent links are each rotatable about their respective central axes relative to one another.

In some embodiments, at least one of the front flange and the rear flange of each link are comprised of a first material; and the first cylindrical portion, second cylindrical portion, and base of each link are comprised of a second material different than the first material. In some embodiments, the first material is more malleable than the second material.

In some embodiments, at least one of the front flange and the rear flange of each link have a first thickness; and the first cylindrical portion and the second cylindrical portion of each link have a second thickness that is greater than the first thickness.

In some embodiments, an armored cable assembly includes the protective covering system of claim 1. In some embodiments, the armored cable further includes: a plastic outer jacket and Kevlar surrounding the protective covering system; and one or more optical fiber positioned with coupled links of the protective covering system.

In another illustrative embodiment, a protective covering system for an optical fiber comprises: a plurality of links that are coupleable together. Each link includes a first portion defined about a central axis, the first portion including insertion end of the link. Each link further includes a second portion defined about the central axis, the second portion including a receiving end of the link, wherein the second portion is more narrow than the first portion. Each link further includes an outer wall facing toward the insertion end of the link and an inner wall facing toward the receiving end of the link. Each link further includes a rear flange defined at the receiving end of the link and extending inwardly toward the central axis; and a front flange defined at the insertion end of the link and extending outwardly away from the central axis. When adjacent links, including a forward link and a rearward link of the plurality of links, are coupled to one another: (i) the rear flange of the forward link is positioned axially between the outer wall of the rearward link and the front flange of the rearward link, and (ii) the front flange of the rearward link is positioned axially between the inner wall of the forward link and the rear flange of the forward link.

In some embodiments, when the adjacent links are coupled to one another, the adjacent links are movable axially relative to one another. In some embodiments, when the adjacent links are coupled to one another, the central axes of the adjacent links are movable relative to one another such that the central axes are unaligned with one another. In some embodiments, when the adjacent links are coupled to one another, the adjacent links are each rotatable about their respective central axes relative to one another.

In some embodiments, one of the front flange and the rear flange of each link is comprised of a first material; and the other of the front flange and the rear flange of each link is comprised of a second material that is deformable relative to the first material. In some embodiments, the first portion and second portion of each link is comprised of the first material.

In another illustrative embodiment, a method of coupling adjacent links of a protective covering system for optical cables comprises: inserting an optical fiber into a plurality of links; inserting a second portion of a rearward link of the plurality of links into a first portion of a forward link of the plurality of links. Inserting a second portion of a rearward link into a first portion of a forward link includes urging a front flange of the rearward link into contact with and past a rear flange of a forward link. Urging a front flange of the rearward link into contact with and past a rear flange of the forward link includes deforming at least one of the front flange of the rearward link and the rear flange of the forward link.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 shows that the link includes a first portion, a narrower second portion, a rear flange on the first portion, and a front flange on the second portion;

FIG. 4 illustrates a cross section view of two links spaced apart from each other in an uncoupled position, wherein each of the two links are identical to the link of FIGS. 2 and 3;

FIG. 5a shows that, in the coupled position, the flanges of the coupled links are deformed as compared to the flanges shown in FIG. 4;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
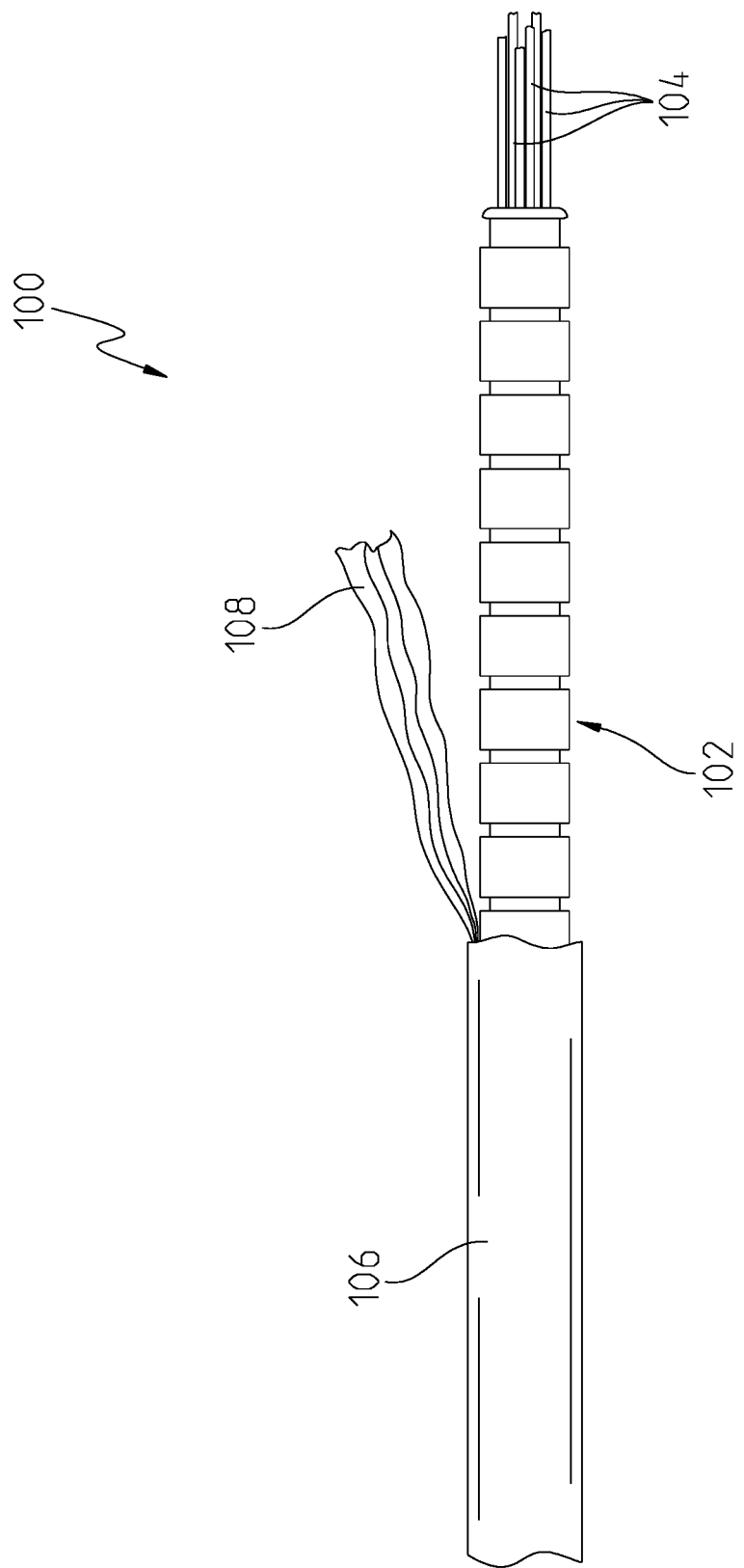
FIG. 1 illustrates a perspective view of armored cable assembly including a protective covering system for optical fibers.

FIG. 1 illustrates a perspective view of an armored cable assembly 100. The armored cable assembly 100 includes a protective covering system 102, a plurality of optical fibers 104 positioned within the protective covering system 102, an outer jacket 106 surrounding the protective covering system 102, and para-aramid synthetic fibers 108 positioned between the outer jacket 106 and the protective covering system 102. It should be appreciated that FIG. 1 is merely an illustrative example showing one arrangement for the armored cable assembly 100 contemplated by this disclosure, and that as used herein, the armored cable assembly 100 may include any number of arrangements and components so long as it includes the protective covering system 102—or another protective covering system that is described or suggested herein. The protective covering systems may be used in a variety of cable assemblies including those with one or more optical fibers, those with any number of outer jackets or casings, and those with or without para-aramid synthetic fibers or similar materials sufficient to add additional protection to the optical fibers.

Figure 2:
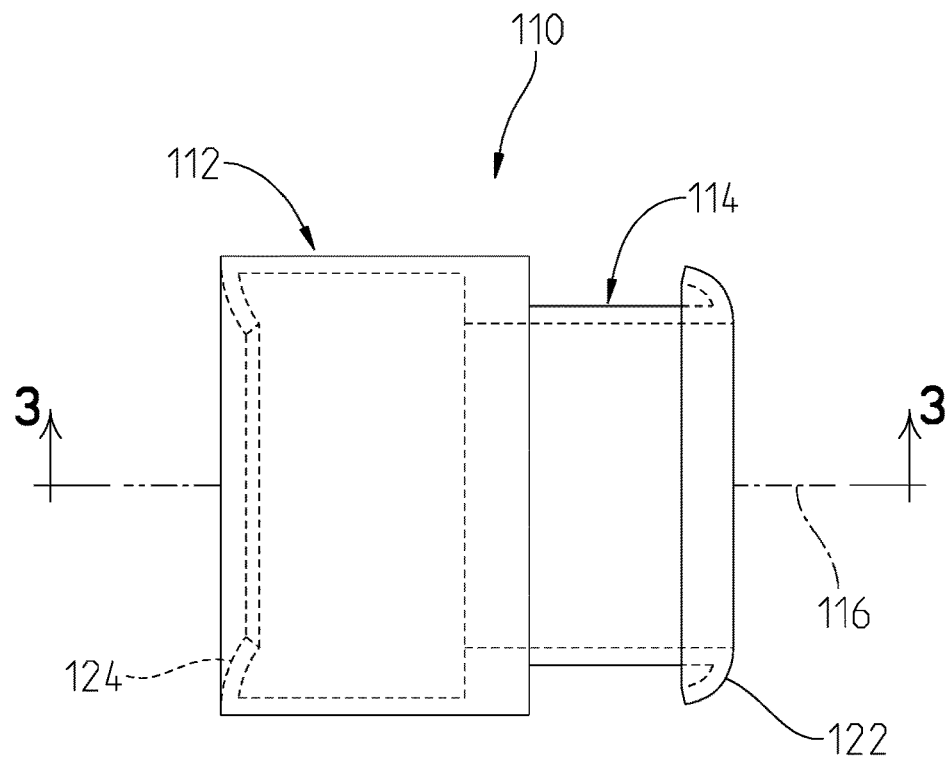
FIG. 2 illustrates a side view of a link of the protective covering system of FIG. 1.

FIG. 2 illustrates a side view of a link 110 included in the protective covering system 102. The link 110 includes a first portion 112 and a second portion 114 that is narrower than the first portion 112. In the illustrative embodiment, the first and second portions 112, 114 are each cylindrical and defined about a central axis 116 of the link 110.

Figure 3:
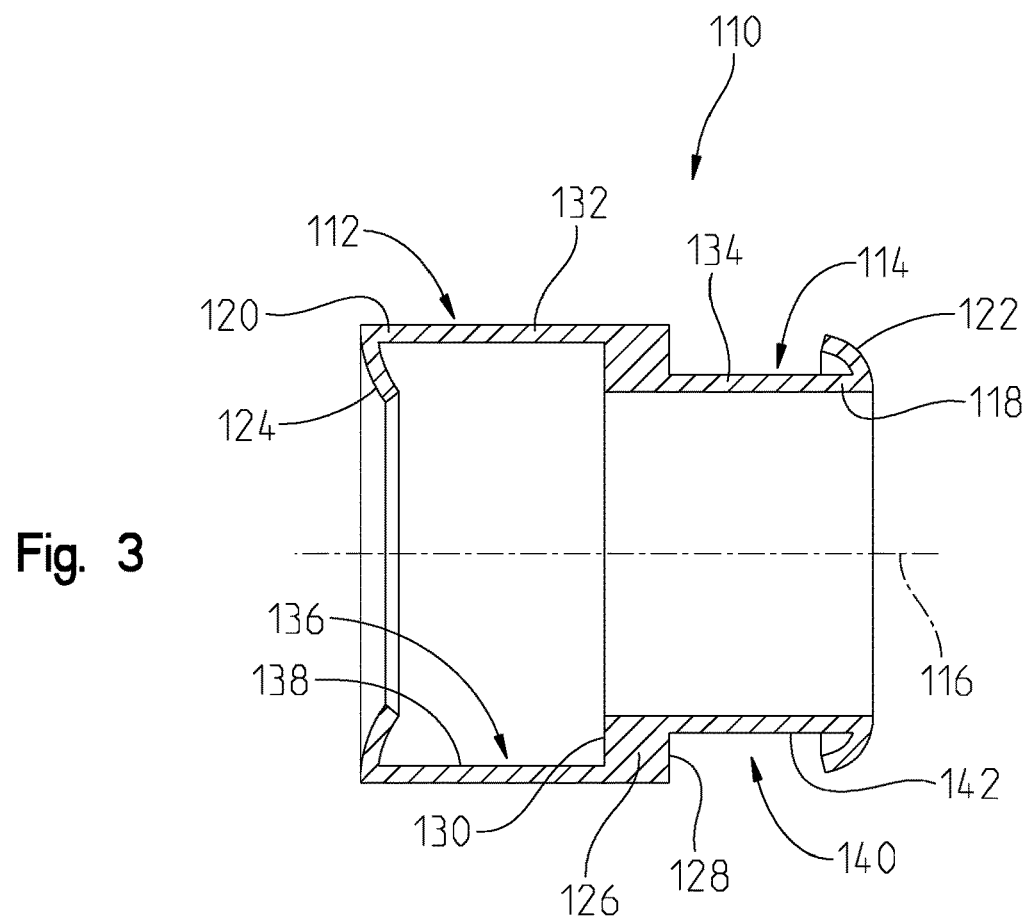
FIG. 3 illustrates a cross section view of the link shown in FIG. 2.

FIG. 3 illustrates a cross section view of the link 110, with the cross section taken at the line 3-3 of FIG. 2. As shown in FIG. 3, the first and second portions 112, 114 are each defined by side walls 132, 134, respectively. The first portion 112 includes a terminating end of the link 110 referred to as the receiving end 120, and the second portion 114 includes another terminating end of the link 110 referred to as the insertion end 118. The link 110 includes a front flange 122 defined at the insertion end 118 and a rear flange 124 defined at the receiving end 120.

Referring still to FIG. 3, the link 110 includes a base 126 extending radially outwardly relative to the central axis 116 between the first portion 112 and the second portion 114. The base 126 includes an outer wall 128 facing axially toward the insertion end 118 of the link 110 and an inner wall 130 facing axially toward the receiving end 120 of the link 110. In FIG. 3, the outer and inner walls 128, 130 are illustrated as perpendicular to the side walls 132, 134; however, in other embodiments, one or both of the outer and inner walls 128, 130 may extend at a non-right angle relative to the side walls 132, 134.

FIG. 4 illustrates a cross section view of a two links of the protective covering system 102, which are referred to as adjacent links, or a forward link 110a and a rearward link 110b. In FIG. 4, the adjacent links 110a, 110b are shown in an uncoupled position. It should be appreciated that reference numbers having a common base number, e.g., 110a and 110b, may be positioned in different locations along the protective covering system 102; however, any description herein otherwise applies equally to all components having common base numbers. In this regard, as reference is made to components of the link 110a, and it should be appreciated that such disclosure applies equally to the like components of link 110b and other links 110 included in the protective covering system 102.

Figure 5A:
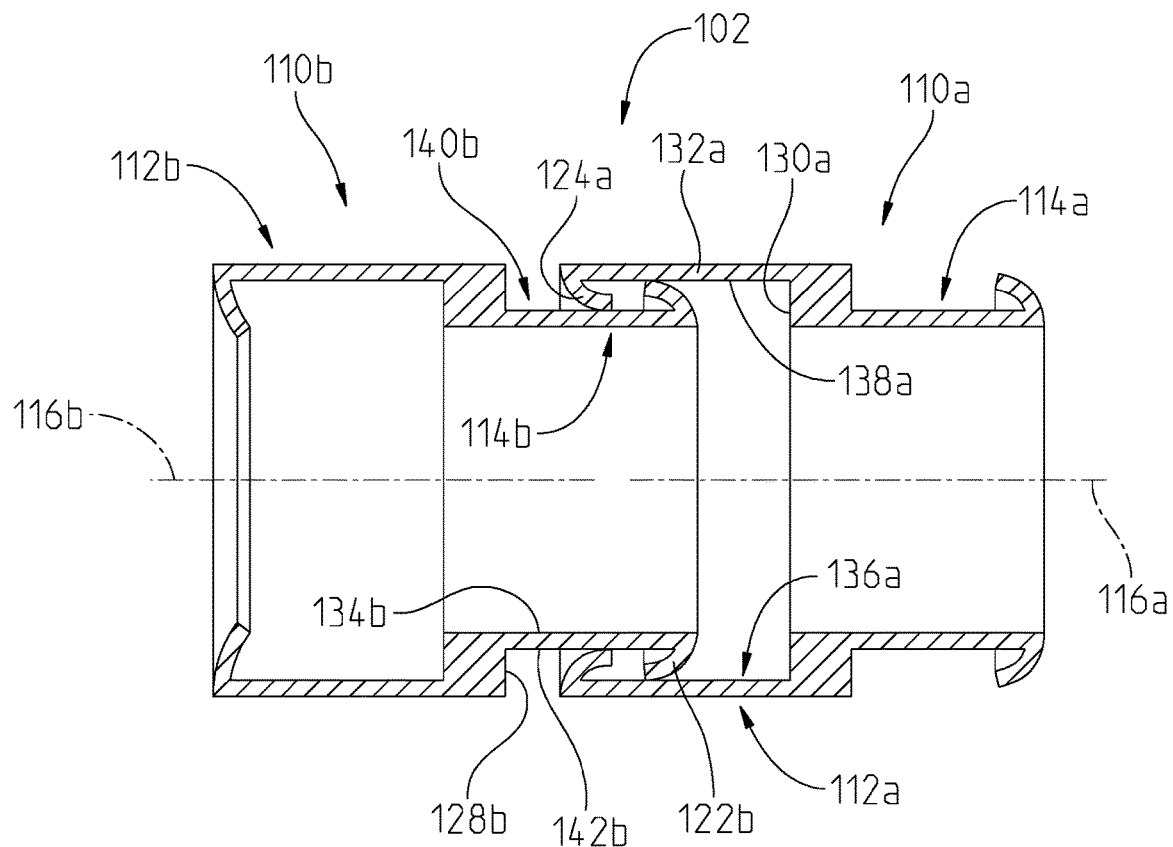
FIG. 5a illustrates a cross section view of the two links of FIG. 4 in a coupled position.

As shown in FIG. 4, in the uncoupled position, the rear flange 124a of the forward link 110a is positioned at a first angle relative to an inner face 138a of the side wall. FIG. 5 illustrates a cross section view of the forward link 110a and the rearward link 110b in a coupled position. As shown in FIG. 5, in the coupled position, the rear flange 124a of the forward link 110a is positioned at a second angle relative to an inner face 138a of the side wall 132a. The second angle—shown in FIG. 5—is less than the first angle shown in FIG. 4. In other words, FIGS. 4-5a show the deformation of the rear flange 124a as the adjacent links 110a, 110b are moved from the uncoupled position to the coupled position.

Similarly, as shown in FIG. 4, in the uncoupled position, the front flange 122b of the rearward link 110b is positioned at a first angle relative to an outer face 142b of the side wall 134b. As shown in FIG. 5, in the coupled position, the front flange 122b is positioned at a second angle relative to the outer face 142b of the side wall 134b. The second angle—shown in FIG. 5—is less than the first angle shown in FIG. 4. In other words, FIGS. 4-5a show the deformation of the front flange 122b as the adjacent links 110a, 110b are moved from the uncoupled position to the coupled position. In some embodiments, first and second angles are each less than 90 degrees, yet in other embodiments, the first and second angles may be greater than 90 degrees so long as the front and rear flanges 122, 124 are deformable when urged into contact with one another.

In some embodiments, one or both of the front and rear flanges 122, 124 of each link 110 are concave or curved. For example, as shown in FIG. 3, the front flange 122 is curved back toward the side wall 134, and the rear flange 124 is curved back toward the side wall 132. As shown in FIG. 4, in the uncoupled position, the rear flange 124a of the forward link 110a has a first degree of concavity, and as shown in FIG. 5a, in the coupled position, the rear flange 124a of the forward link 110a has a second degree of concavity that is greater than the first degree of concavity. In other words, the rear flange 124a is more concave in the coupled position than in the uncoupled position, which is due to the deformation of the rear flange 124a during the coupling process. Similarly, as shown in FIG. 4, in the uncoupled position, the front flange 122b of the rearward link 110b has a first degree of concavity, and as shown in FIG. 5a, in the coupled position, the front flange 122b of the rearward link 110b has a second degree of concavity that is greater than the first degree of concavity. In other words, the front flange 122b is more concave in the coupled position than in the uncoupled position, which is due to the deformation of the front flange 122b during the coupling process.

In use, the second portion 114b of the rearward link 110b is inserted into the first portion 112a of the forward link 110a. In this process, the front flange 122b of the rearward link 110b is urged into contact with, and then past, the rear flange 124a of the forward link 110a. Further, in this process, in the illustrative embodiment shown in FIGS. 4-5a, as the adjacent links 110a, 110b are moved from the uncoupled position to the coupled position, the front flange 122b of the rearward link 110b and the rear flange 124a of the forward link 110 are each deformed. Therefore, in the illustrative embodiments shown in FIGS. 4 and 5a the front and rear flanges 122, 124 each deform upon contact with one another; however, in other embodiments as described below, only one of the front and rear flanges 122, 124 of each link are deformed.

As shown in FIG. 5a when adjacent links 110a, 110b are in the coupled position, the first portion 112a of the forward link 110a radially overlaps the second portion 114b of the rearward link 110b. This forms a two-layer barrier of the protective covering system 102, which is advantageous for maximum pull tension, minimum bend radius, crush loading capacity, and rodent protection of the armored cable assembly 100. For example, the overlap of the first and second portions 112a, 114b of adjacent links 110a, 110b increases the crush loading capacity and prevents rodents from accessing the optical fibers with in the protective covering system 102.

As suggested by FIG. 5a, when the adjacent links 110a, 110b are coupled to one another, the adjacent links 110a, 110b are movable axially relative to one another. For example, the rear flange 124a of the forward link 110a is movable axially between the outer wall 128b of the rearward link 110b and the front flange 122b of the rearward link 110b. Further, the front flange 122b of the rearward link 110b is movable axially between the inner wall 130a of the forward link 110a and the rear flange 124a of the forward link 110a. This is advantageous in that it may increase the maximum pull tension associated with the armored cable assembly 100.

Referring still to FIG. 5a, the adjacent links 110a, 110b are rotatable about their respective central axes 116a, 116b relative to one another. This is advantageous over conventional metal tubing for optical fibers because the rotational freedom of movement of the adjacent links 110a, 110b may reduce the minimum bend radius of the armored cable assembly 100.

Figure 5B:
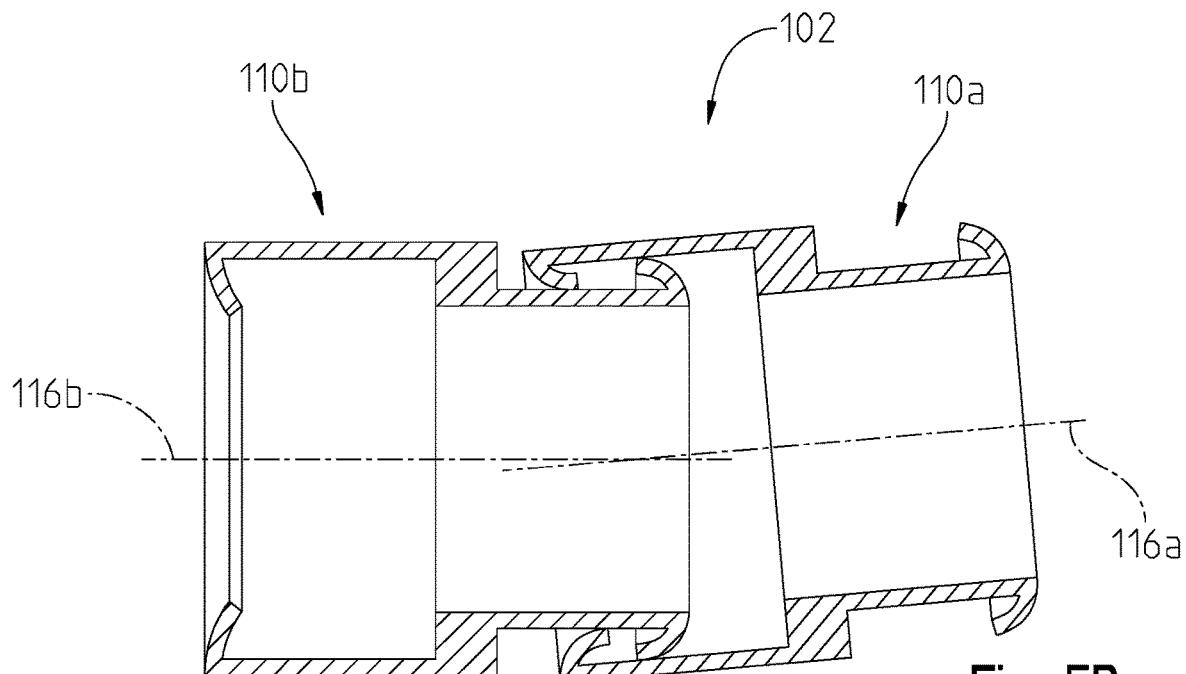
FIG. 5b illustrates a cross section view of the two links of FIG. 5a, except that in FIG. 5b, the links are tilted relative to one another such that their central axes are unaligned.

As shown in FIG. 5b, when the adjacent links 110a, 110b are coupled to one another, the adjacent links 110 are movable relative to one another such that the central axes 116a, 116b can become unaligned. In other words, the links 110a, 110b may tilt relative to one another, which is advantageous in that it may reduce the minimum bend radius of the armored cable assembly 100.

In the illustrative embodiment shown in FIG. 3, the link 110 includes in a first cavity 136 formed by the rear flange 124, the inner wall 130 of the base 126, and the inner face 138 of the first portion 112 of the link 110. Similarly, the link 110 includes a second cavity 140 formed by the front flange 122, the outer wall 128 of the base 126, and the outer face 142 of the second portion 114 of the link 110. As shown in FIG. 5a, when adjacent links 110a, 110b are in the coupled position, the rear flange 124a of the forward link 110a is positioned in the second cavity 140b of the rearward link 110b. Similarly, the front flange 122b of the rearward link 110b is positioned in the first cavity 136a of the forward link 110a.

In other embodiments, the first and second cavities 136, 140 may be formed by other structures, components, or arrangements. For example, in some embodiments, each link 110 may be frustoconical with a single side wall uniformly extending around the link 110 at angle relative to the central axis 116. In such an embodiment, the base 126 is eliminated. Therefore, the first cavity 136 is formed by the depression at the connection between an inner face of the angling single side wall and the rear flange 124. Similarly, the second cavity 140 is formed by the depression at the connection between an outer face of the angling single side wall and the front flange 122.

In other embodiments, each link 110 may be hour-glass shaped. In other words, the side wall 132 of the first portion 112 may extend from the receiving end 120 toward the side wall 134 of the second portion 114 radially inward relative to the central axis 116; and, the side wall 134 may extend from the insertion end 118 toward the side wall 132 of the first portion 112 radially inward relative to the central axis 116. In such an embodiment, the side walls 132, 134 meet at the narrowest location along the link 110. In such an embodiment, the first cavity 136 is formed by the depression at the connection between the inner face 138 of the angling side wall 132 and the rear flange 124. Similarly, the second cavity 140 is formed by the depression at the connection between the outer face 142 of the angling side wall 134 and the front flange 122.

Figure 6:
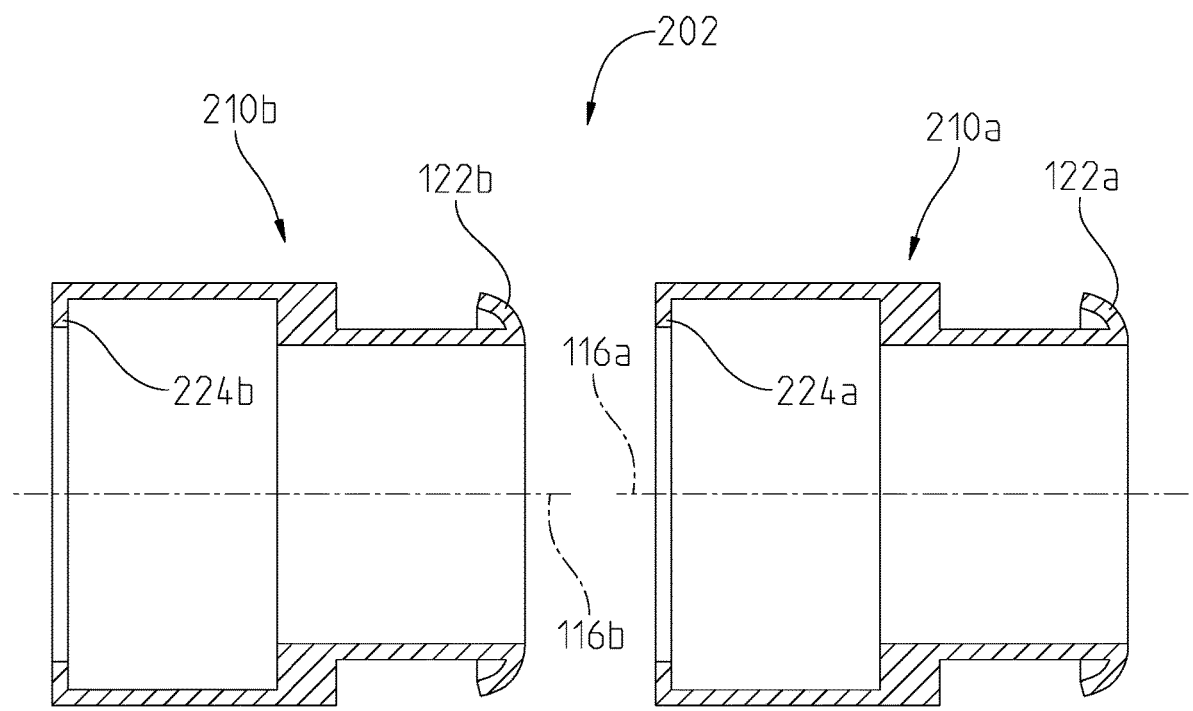
FIG. 6 illustrates a cross section view of other links of a protective covering system for optical fibers, wherein the links shown in FIG. 6 have a rigid rear flange and a deformable front flange.
Figure 7:
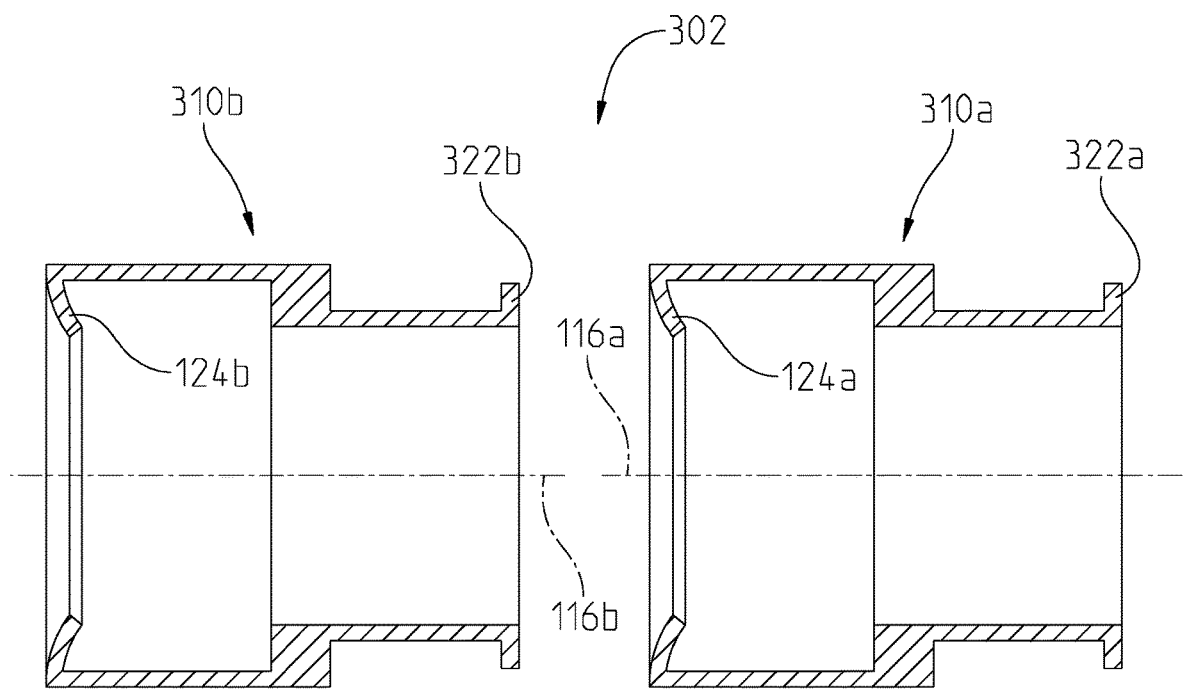
FIG. 7 illustrates a cross section view of other links of a protective covering system for optical fibers, wherein the links shown in FIG. 7 have a rigid front flange and a deformable rear flange.

FIGS. 6 and 7 illustrate additional embodiments of adjacent links 210a, 210b, 310a, 310b in which one of the front and rear flanges of each link is rigid whereas the other of the front and rear flanges is deformable relative to the rigid flange. For example, FIG. 6 illustrates a protective covering system 202, in which the rear flanges 224a, 224b are rigid, and the front flanges 222a, 222b are deformable relative to the rear flanges 224a, 224b. In use, as the adjacent links 210a, 210b are moved from the uncoupled position to the coupled position, the front flange 222b of the rearward link 210b is urged into contact with and moved past the rear flange 224a of the forward link 210a, and the front flange 222b of the rearward link 210b deforms—i.e. curves, pivots, or otherwise bends inward toward the central axis 216b of the rearward link 210b.

Similarly, FIG. 7 illustrates a protective covering system 302, in which the front flanges 322a, 322b are rigid, and the rear flanges 324a, 324b are deformable relative to the front flanges 322a, 322b. In use, as the adjacent links 310a, 310b are moved from the uncoupled position to the coupled position, the front flange 322b of the rearward link 310b is urged into contact with and moved past the rear flange 324a of the forward link 310a, and the rear flange 324a of the forward link 310a deforms—i.e. curves, pivots, or otherwise bends outward away from the central axis 316a of the forward link 310a. It should be appreciated that description herein regarding the links 110 may be equally applicable to the links 210, 310, especially regarding the thickness and material of the flanges of each link and regarding the movement of coupled links relative to one another.

In some embodiments, the front and rear flanges 122, 124 of each link 110 are comprised of a first material, and the remaining portions of each link 110 are comprised of a second material that is different from the first material. For example, the first portion 112, second portion 114, and base 126 of each link 110 may be comprised of the second material. In such an embodiment, the first material is more malleable than the second material such that the first material deforms more easily than the second material. In other embodiments, such as those shown in FIGS. 6 and 7, one of the front and rear flanges of each link is formed of the first material and the other of the front rear flanges is formed of the second material. Therefore, in such embodiments, in use, as the adjacent links are moved from the uncoupled position to the coupled position, only one of the front and rear flanges deforms during contact with the other of the front and rear flanges.

In some embodiments, the front and rear flanges 122, 124 of each link 110 have a first thickness, and the first and second portions 112, 114 of each link have a second thickness that is greater than the first thickness. In such an embodiment, the portions of each link 110 having a lesser thickness are more malleable than the portions of each link 110 having a greater thickness. In some embodiments, such as those shown in FIGS. 6 and 7, one of the front and rear flanges of each link has a greater thickness than the other of the front rear flanges. Therefore, in such embodiments, in use, as the adjacent links are moved from the uncoupled position to the coupled position, only one of the front and rear flanges deforms during contact with the other of the front and rear flanges.

Figure 8:
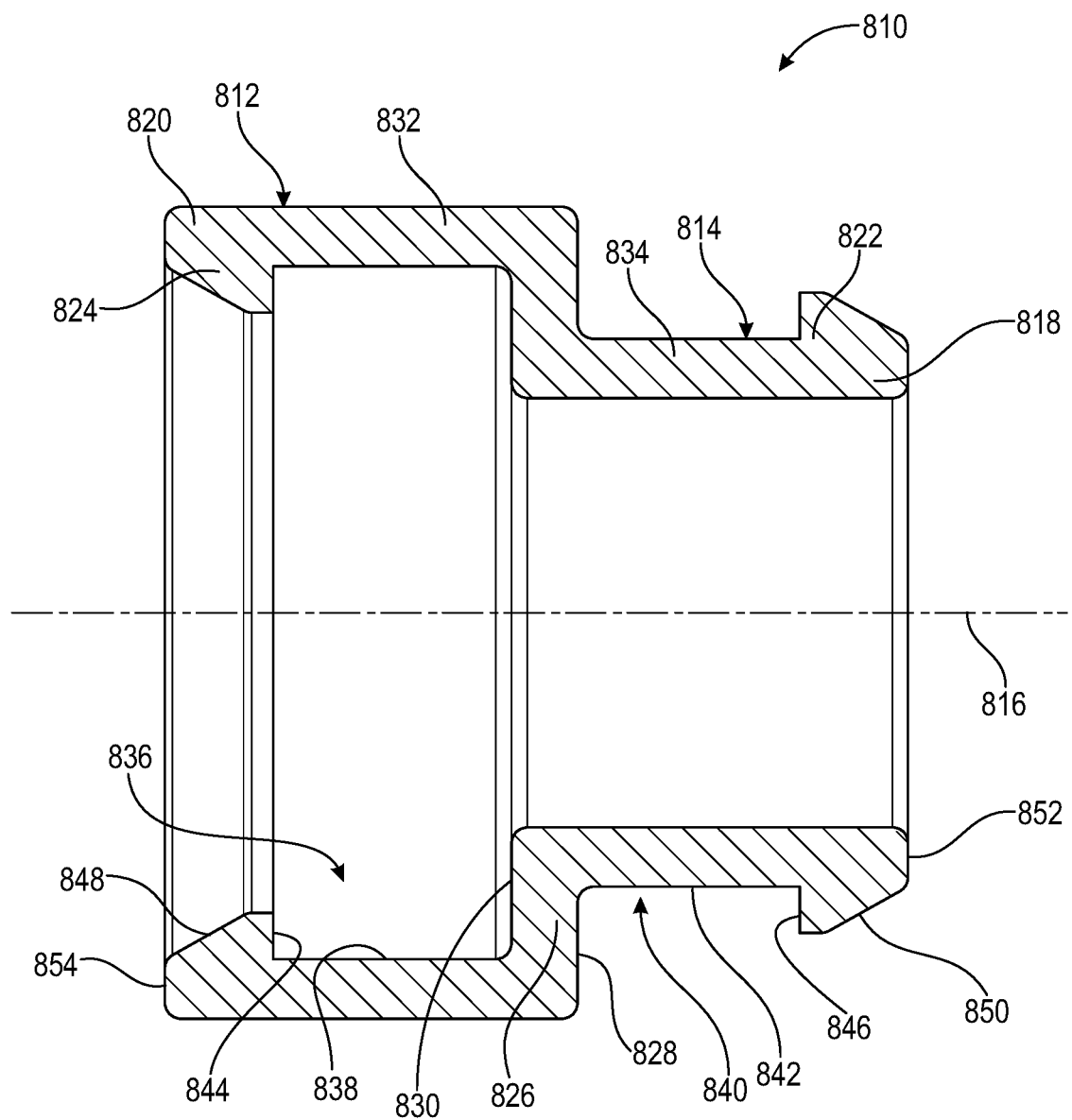
FIG. 8 illustrates a cross section view of another link of a protective covering system for optical fibers, wherein the links shown in FIG. 8 have carefully designed flanges with structural advantageous resulting therefrom as described herein.

FIG. 8 illustrates a cross section view of a link 810. The link 810 is similar to the link 110 except that the flanges of the link 810 are carefully designed with a different shape than the flanges of the link 110, which provides advantages including: increased durability, temporary deformation during the coupling process, and a more secure coupling. As shown in FIG. 8, the link 810 includes a first portion 812 and a second portion 814 that is narrower than the first portion 812. In the illustrative embodiment, the first and second portions 812, 814 are each cylindrical and defined about a central axis 816 of the link 810. The first and second portions 812, 814 are each defined by side walls 832, 834, respectively. The first portion 812 includes a terminating end of the link 810 referred to as the receiving end 820, and the second portion 814 includes another terminating end of the link 810 referred to as the insertion end 818. The link 810 includes a front flange 822 defined at the insertion end 818 and a rear flange 824 defined at the receiving end 820.

Referring still to FIG. 8, the link 810 includes a base 826 extending radially outwardly relative to the central axis 816 between the first portion 812 and the second portion 814. The base 826 includes an outer wall 828 facing axially toward the insertion end 818 of the link 810 and an inner wall 830 facing axially toward the receiving end 820 of the link 810. In FIG. 8, the outer and inner walls 828, 830 are illustrated as perpendicular to the side walls 832, 834.

Figure 9:
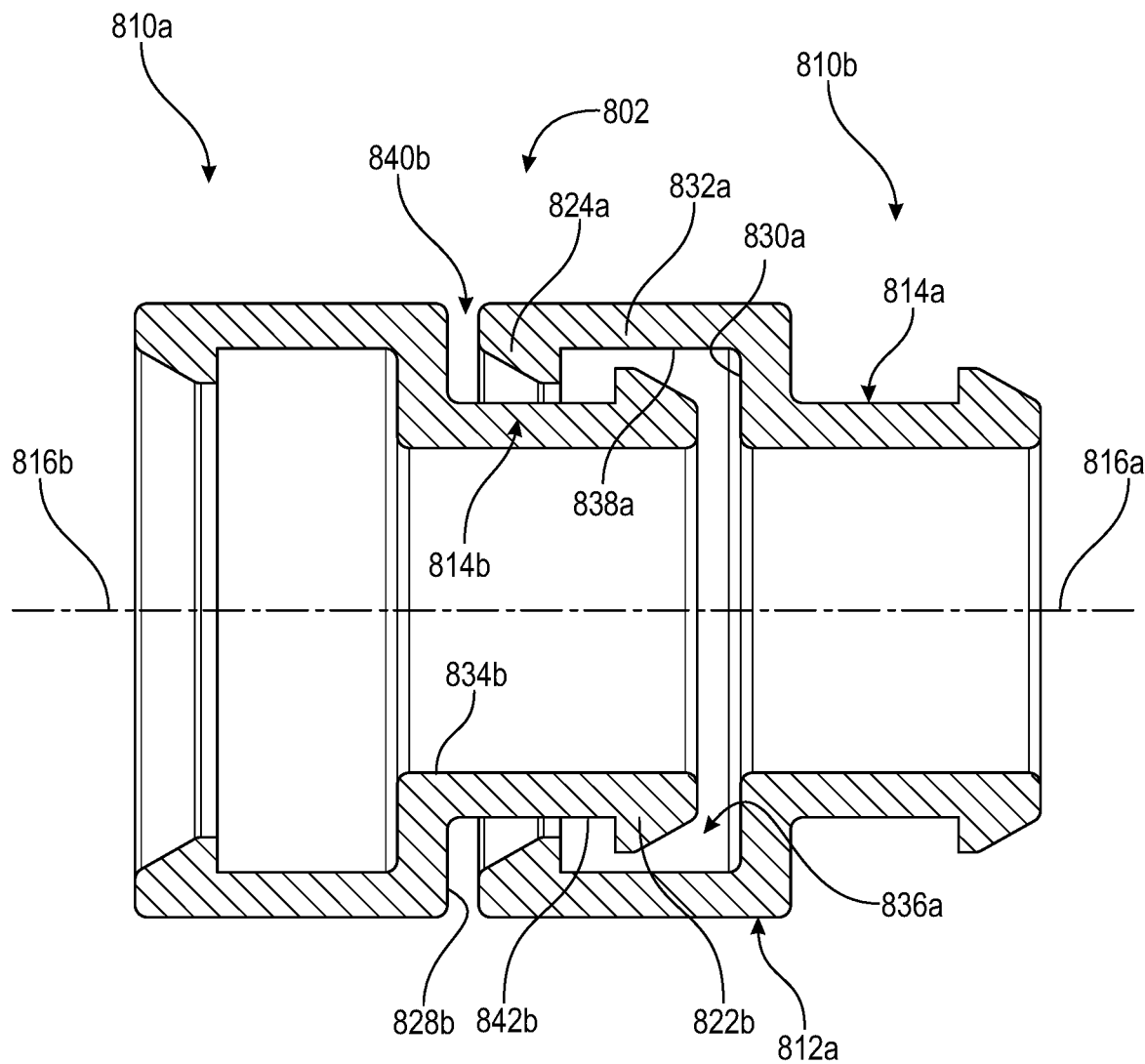
FIG. 9 illustrates a cross section view of two links of the type in FIG. 8, shown in a coupled position.

FIG. 9 illustrates a cross section view of a two links of the protective covering system 802, which are referred to as adjacent links, or a forward link 810a and a rearward link 810b. In FIG. 9 the adjacent links 810a, 810b are shown in a coupled position. It should be appreciated that reference numbers having a common base number, e.g., 810a and 810b, may be positioned in different locations along the protective covering system 802; however, any description herein otherwise applies equally to all components having common base numbers. In this regard, as reference is made to components of the link 810a, and it should be appreciated that such disclosure applies equally to the like components of link 810b and other links 810 included in the protective covering system 802.

In use, the second portion 814b of the rearward link 810b is inserted into the first portion 812a of the forward link 810a. In this process, the front flange 822b of the rearward link 810b is urged into contact with, and then past, the rear flange 824a of the forward link 810a. Further, in this process, as the adjacent links 810a, 810b are moved from an uncoupled position to a coupled position, at least one of the front flange 822b of the rearward link 810b and the rear flange 824a of the forward link 810 are temporarily deformed.

In the illustrative embodiment shown in FIG. 8, the link 810 includes in a first cavity 836 formed by the rear flange 824, the inner wall 830 of the base 826, and an inner face 838 of the first portion 812 of the link 810. Similarly, the link 810 includes a second cavity 840 formed by the front flange 822, the outer wall 828 of the base 826, and the outer face 842 of the second portion 814 of the link 810. As shown in FIG. 9, when adjacent links 810a, 810b are in the coupled position, the rear flange 824a of the forward link 810a is positioned in the second cavity 840b of the rearward link 810b. Similarly, the front flange 822b of the rearward link 810b is positioned in the first cavity 836a of the forward link 810a.

Referring again to FIG. 8, each front flange 822 includes a firm wall 846 that extends in the radial direction. In the illustrative embodiment, the firm wall 846 is perpendicular to the central axis 816. The front flange 822 further includes a sloped wall 850 extending at a first angle relative to the firm wall 846. The sloped wall 850 extends toward the firm wall 846 as it extends away from the central axis 816. The insertion end 818 of each link 810 terminates in a head wall 852 that is parallel to the firm wall 846. The sloped wall 850 extends between the head wall 852 and the firm wall 846.

Referring still to FIG. 8, each rear flange 824 includes a firm wall 844 that extends in the radial direction. In the illustrative embodiment, the firm wall 844 is perpendicular to the central axis 816. The rear flange 824 further includes a sloped wall 848 extending at a second angle relative to the firm wall 844. The sloped wall 848 extends toward the firm wall 844 as it extends toward the central axis 816. The receiving end 820 of each link 810 terminates in a head wall 854 that is parallel to the firm wall 844. The sloped wall 848 extends between the head wall 854 and the firm wall 844.

In the illustrative embodiment shown in FIG. 8, the first and second angles (between the slope walls and firm walls, respectively) are equal to one another. Such an arrangement facilitates steady abutment and smooth sliding contact between opposing sloped walls as adjacent links are coupled to one another.

As shown in FIG. 9 when adjacent links 810a, 810b are in the coupled position, the first portion 812a of the forward link 810a radially overlaps the second portion 814b of the rearward link 810b. This forms a two-layer barrier of the protective covering system 802, which is advantageous for maximum pull tension, minimum bend radius, crush loading capacity, and rodent protection of the armored cable assembly 100. For example, the overlap of the first and second portions 812a, 814b of adjacent links 810a, 810b increases the crush loading capacity and prevents rodents from accessing the optical fibers with in the protective covering system 802.

As suggested by FIG. 9, when the adjacent links 810a, 810b are coupled to one another, the adjacent links 810a, 810b are movable axially relative to one another. For example, the rear flange 824a of the forward link 810a is movable axially between the outer wall 828b of the rearward link 810b and the front flange 822b of the rearward link 110b. In this arrangement, when adjacent coupled links move axially relative to one another, the firm walls of adjacent links abut one another, and the perpendicular nature of each wall relative to the central axis is advantageous to reduce ware and prevent uncoupling as the firm walls abut one another. Additionally, the head wall of the rear flange 824a of the forward link 110a abuts the outer wall 828b of the rearward link 810b, and the perpendicular nature of each wall relative to the central axis is advantageous to reduce ware as the walls abut one another.

Further, the front flange 822b of the rearward link 810b is movable axially between the inner wall 830a of the forward link 810a and the rear flange 824a of the forward link 810a. This is advantageous in that it may increase the maximum pull tension associated with the armored cable assembly 100. In this arrangement, when adjacent coupled links move axially relative to one another, the firm walls of adjacent links abut one another, and the perpendicular nature of each wall relative to the central axes is advantageous to reduce ware and prevent uncoupling as the firm walls abut one another. Additionally, the head wall of the front flange 822b of the rearward link 110b abuts the inner wall 830a of the forward link 810a, and the perpendicular nature of each wall relative to the central axes is advantageous to reduce ware as the walls abut one another.

Referring still to FIG. 9, the adjacent links 810a, 810b are rotatable about their respective central axes 816a, 816b relative to one another. This is advantageous over conventional metal tubing for optical fibers because the rotational freedom of movement of the adjacent links 810a, 810b may reduce the torsion between adjacent portions of the armored cable assembly 100 relative to other cable assemblies that do not include a plurality of links rotatable relative to each other.

Similar to what is shown in FIG. 5B, when the adjacent links 810a, 810b are coupled to one another, the adjacent links 810 are movable relative to one another such that the central axes 816a, 816b can become unaligned. In other words, the links 810a, 810b may tilt relative to one another, which is advantageous in that it may reduce the minimum bend radius of the armored cable assembly 100.

Figure 10:
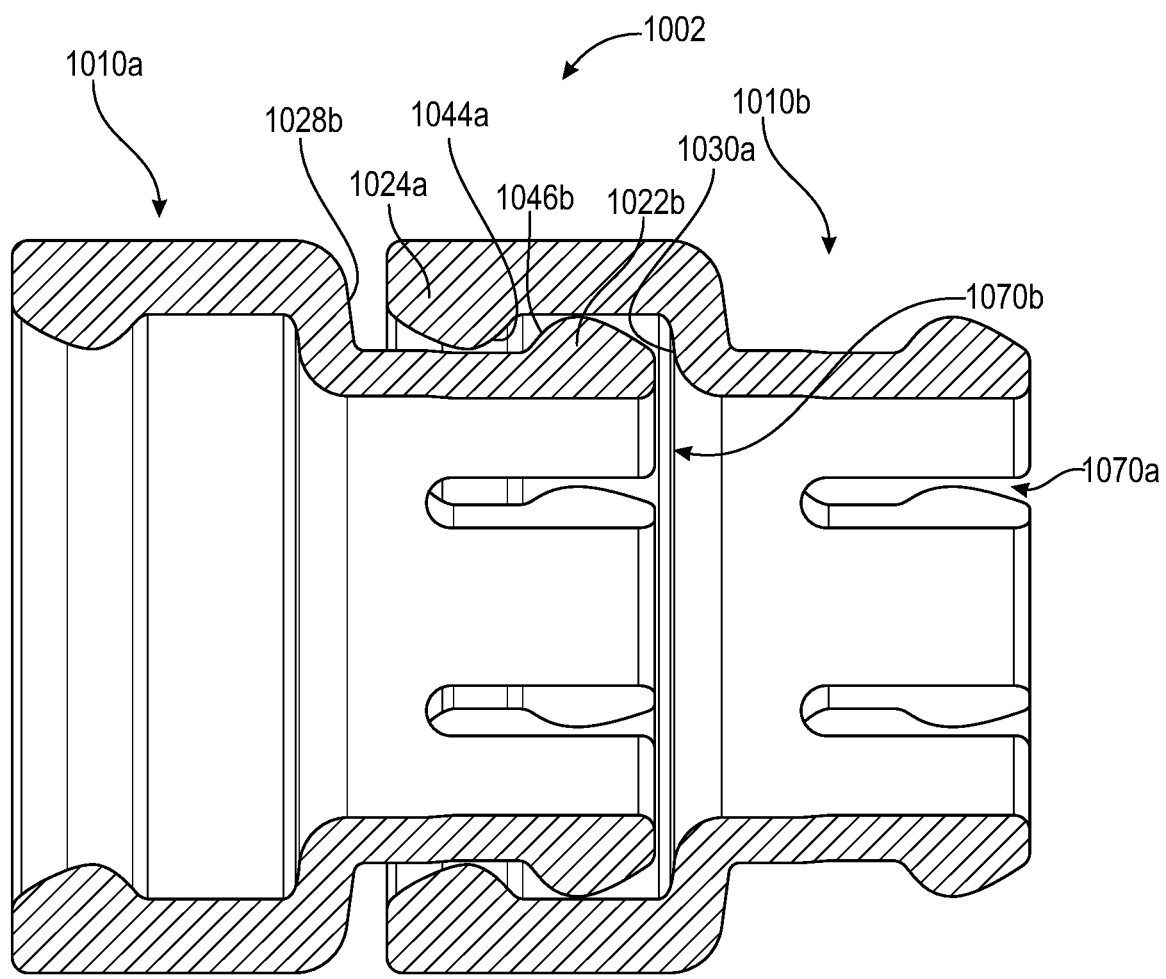
FIG. 10 illustrates a cross section view of two links coupled together to show the all the links shown and described herein may have u-shaped cut-outs formed therein to facilitate temporary deformation.

FIG. 10 illustrates a cross section view of a two links of the protective covering system 1002, which are referred to as adjacent links, or a forward link 1010a and a rearward link 1010b. FIG. 10 illustrates that in some embodiments, the flanges of the links may have rounded portions to facilitate easy of coupling. For example, the rear flange 1024a of the forward link 1010a includes a first portion of firm wall 1044a facing the inner wall 1030a of the forward link 1010a. Additionally, the forward flange 1022b of the rearward link 1010b includes a first portion of firm wall 1046b facing the outer wall 1028b of the rearward link 1010b. In the illustrative embodiment, both firm walls 1044a, 1046b are curved to facilitate easy of coupling, but the curves continue around the radially inward facing portions of the flanges such that second portions of the flanges (facing opposite the first portions) contact one another as the adjacent links are being coupled together and before the flanges are positioned in the cavities.

In the illustrative embodiment shown in FIG. 10, the receiving end of each link 1010a, 1010b is thicker than the insertion end of each link 1010a, 1010b. Moreover, the insertion end of each link 1010a, 1010b includes a plurality of u-shaped cut-outs 1070a, 1070b, respectively, which open at the head wall or terminal edge of the insertion end of each link 1010a, 1010b. It should be appreciated that the u-shaped cut-outs of FIG. 10 are equally applicable to the link 810 and may be present in the link 810 in some embodiments. It should also be appreciated that the u-shaped cut-outs may be formed in the receiving end of a link rather than the insertion end thereof. The u-shaped cut-outs are advantageous because they provide a reduced structural integrity facilitating temporary deformation more easily.

Figure 11:
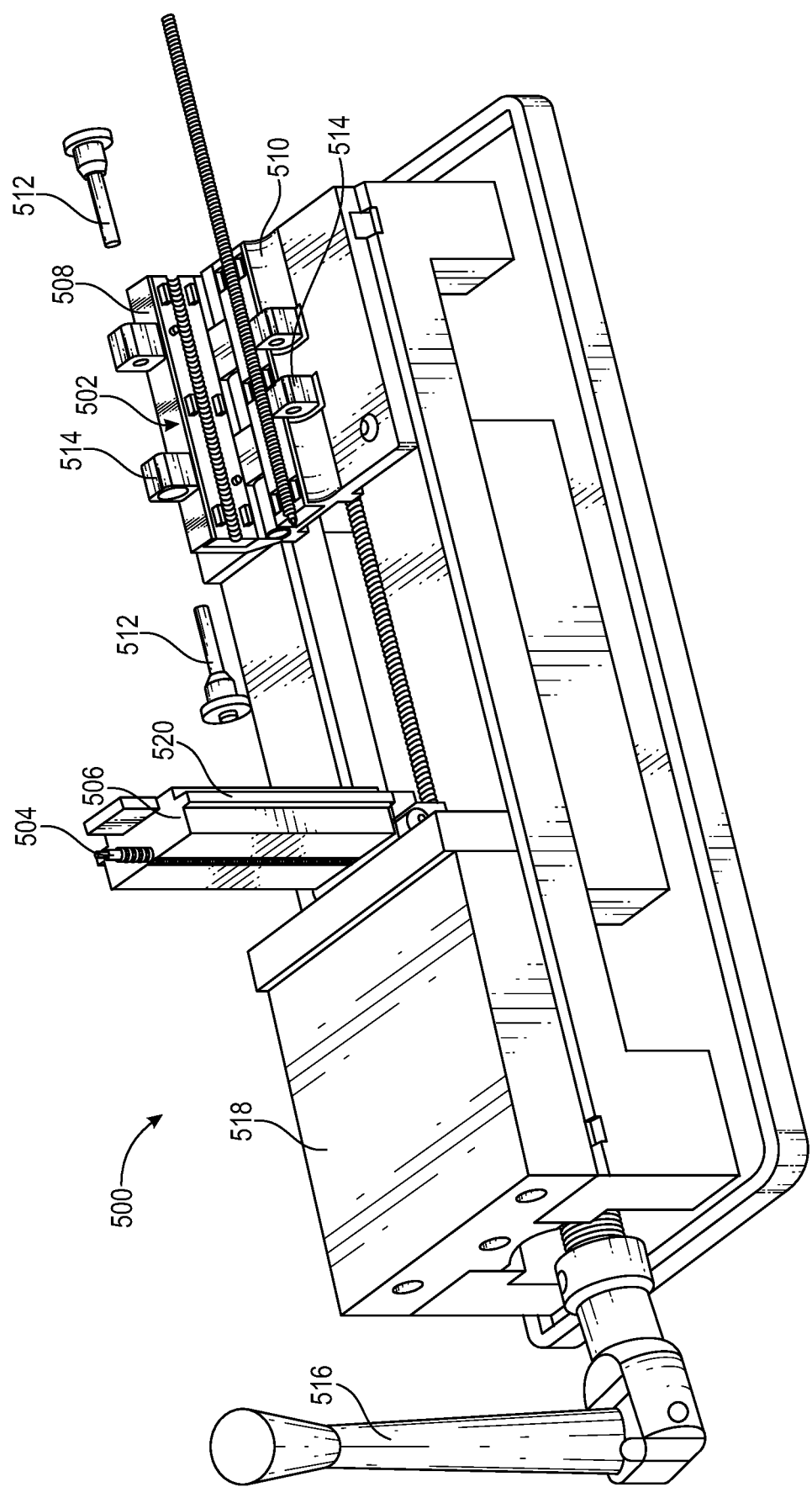
FIG. 11 illustrates a coupling assembly that may be used to perform a coupling method described herein, and components of the coupling assembly are shown in their first position.

Referring now to FIG. 11, a coupling structure 500 is shown, which facilitates a method of coupling together adjacent links of a protective covering system for optical cables. The method comprises inserting a first chain of coupled links (e.g. 810) into a chamber 502 such that an inner space of a receiving end of a forward link (i.e. the rearward-most link in the first chain) is accessible. The method further includes, inserting an insertion portion of a rearward link of a second chain (i.e. the forward-most link in the second chain) into the receiving portion of the forward link. In some embodiments, the second chain is a group of aligned (but not yet coupled) links. For example, the uncoupled links of the second chain maybe advanced onto a guide rod 504 of a rail assembly 506 such that the rear link is the last link slid onto the guide rod.

Figure 12:
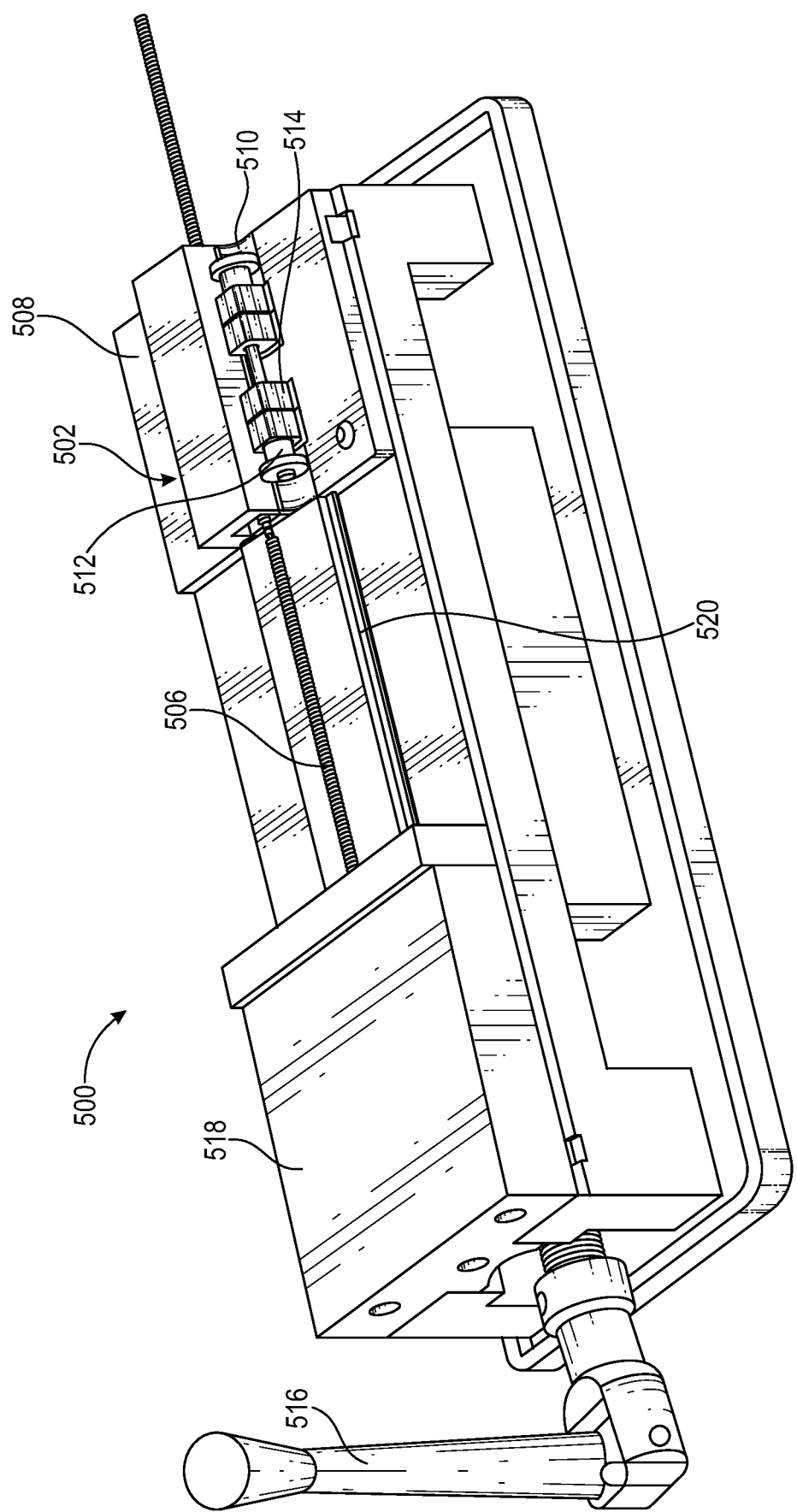
FIG. 12 illustrates the coupling assembly of FIG. 11 with the components shown in their second position.

The second chain (e.g., the plurality of uncoupled links) may be aligned with the first chain prior to inserting the insertion end of the rearward link into the receiving end of the forward link. To that end, the rail assembly 506 may be pivotable relative to the chamber from a first position shown in FIG. 11 (in which the links may be advanced downwardly onto the guide rod such that the links of the second chain are aligned with one another) to a second position shown in FIG. 12 (in which the links of the second chain are aligned with the links of the first chain).

The method may further include securing the first chain in the chamber 502. To illustrate, the chamber 502 may include a first portion 508 pivotable relative to a second portion 510. The chamber 502 may be reconfigurable from a first, open position (see FIG. 11, in which the first chain is not fixed in place relative to the chamber 502) to a second, closed position (see FIG. 12, in which the first chain is fixed in place relative to the chamber 502). The chamber may include a plurality of fasteners 512 configured to be inserted in eyelets 514 of the first and second portions 508, 510 of the chamber 502 to secure the chamber 502 in the second, closed position.

In some embodiments, inserting the insertion end of the rearward link into the receiving end of the forward link includes urging a front flange of the rearward link into contact with and past a rear flange of a forward link. In some embodiments, this includes temporarily deforming at least one of the front flange and the rear flange. To this end, the method may comprise actuating a lever 516 to slide an urging-block 518 along guide rails 520 of the rail assembly 506 nearer to the chamber 502 to cause insertion of the rearward link into the forward link to couple together the first and second chains. In some embodiments, optical fiber may be inserted into a portion of the first chain prior the first chain being coupled to the second chain.

It should be appreciated that in some embodiments, the insertion and receiving ends of the links may include threaded portions for coupling the receiving end of one link to the insertion end of another link. In use, a portion of the chain may require repair. In this case, a gap may be formed in the existing chain. A first portion of the new chain may be coupled to an intact portion of the existing chain by the (snap-in) coupling method described herein throughout. The reward-most link of the first portion of the new chain may include threads in its receiving end. A second portion of the new chain may be coupled to another intact portion of the existing chain (on the other side of the gap) by the (snap-in) coupling method described herein. The forward-most link of the second portion of the new chain may include threads in its insertion end. Regarding the links of the new chain, the threads of the insertion end of one link may be threadingly coupled to threads of the receiving end of the other link. In other embodiments, threaded portions may be reversed such that the threads are on the receiving end of the rearward-most link and the forward end of the forward-most link such that the threads couple to the existing chain, and the new portions of chain are couple to each other by the (snap-in) coupling method described herein throughout. The (snap-in) coupling method described throughout may be used with the threaded coupling method on the same link. For example, one side of the link may include the threads while the other side of the link does not.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are initial to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A protective covering system for an optical fiber comprising:
   a plurality of links that are coupleable together, wherein each link includes:

a first cylindrical portion defined about a central axis, the first cylindrical portion including an receiving end of the link;

a second cylindrical portion defined about the central axis, the second cylindrical portion including an insertion end of the link, wherein the second cylindrical portion has a lesser diameter than the first cylindrical portion;

a base extending radially outwardly relative to the central axis from the second cylindrical portion to the first cylindrical portion, the base including an outer wall facing toward the insertion end of the link and an inner wall facing toward the receiving end of the link;

a rear flange defined at the receiving end of the link and extending inwardly toward the central axis;

a front flange defined at the insertion end of the link and extending outwardly away from the central axis;

wherein, when adjacent links, including a forward link and a rearward link, of the plurality of links are coupled together:

(i) the rear flange of the forward link is positioned axially between the outer wall of the rearward link and the front flange of the rearward link, and (ii) the front flange of the rearward link is positioned axially between the inner wall of the forward link and the rear flange of the forward link;

wherein the front flange of each link includes a first surface facing the base;

wherein the front flange of each link is tapered such that a second surface of the front flange extends away from the first surface toward the central axis;

wherein the front flange of each link includes a third surface extending between the first surface and second surface;

wherein the rear flange of each link includes a fourth surface facing the base;

wherein the rear flange of each link is tapered such that a fifth surface of the rear flange extends away from the fourth surface and away from the central axis;

wherein the rear flange of each link includes a sixth surface extending between the fourth surface and fifth surface; and wherein the sixth surface is nearer to the central axis than is the third surface.

2. The protective covering system of claim 1, wherein when the adjacent links are coupled to one another, the adjacent links are movable axially relative to one another.

3. The protective covering system of claim 1, wherein when the adjacent links are coupled to one another, the adjacent links are each rotatable about their respective central axes relative to one another.

4. The protective covering system of claim 1, wherein when the adjacent links are coupled to one another, the rear flange of the forward link is movable axially between the outer wall of the rearward link and the front flange of the rearward link; and wherein when the adjacent links are coupled to one another, the front flange of the rearward link is movable axially between the inner wall of the forward link and the rear flange of the forward link.

5. The protective covering system of claim 1, wherein when viewed in cross section through the central axis the front flange and the rear flange of each link have the same shape.

6. The protective covering system of claim 1, wherein the first surface extends perpendicularly relative to the central axis of the link.

7. The protective covering system of claim 1, wherein the third surface extends parallel to the central axis.

8. The protective covering system of claim 1, wherein the fourth surface extends perpendicularly relative to the central axis of the link; and wherein the sixth surface extends parallel to the central axis.

9. The protective covering system of claim 1, wherein when the adjacent links are coupled to one another, the adjacent links are movable relative to one another from a first position in which their respective central axes are aligned to a second position in which their respective central axes are unaligned.

10. The protective covering system of claim 1, wherein the second cylindrical portion of each link includes a plurality of u-shaped cut-outs defined therein; and wherein each u-shaped cut-out opens toward the insertion end of the link.

11. A protective covering system for an optical fiber comprising:

a plurality of links that are coupleable together, wherein each link includes:

a first cylindrical portion having an inner surface defined about a central axis, the first cylindrical portion including a receiving end of the link;

a second cylindrical portion having an outer surface defined about the central axis, the second cylindrical portion including an insertion end of the link, wherein the second cylindrical portion is has a lesser diameter than the first cylindrical portion;

an outer wall facing toward the insertion end of the link;

an inner wall opposite the outer wall facing toward the receiving end of the link;

a rear flange defined at the receiving end of the link and extending inwardly toward the central axis;

a front flange defined at the insertion end of the link and extending outwardly away from the central axis;

wherein, when adjacent links, including a forward link and a rearward link of the plurality of links, are coupled together: (i) the rear flange of the forward link is positioned in a cavity formed by the outer wall of the rearward link, the front flange of the rearward link, and the outer surface of the first cylindrical portion of the rearward link, and (ii) the front flange of the rearward link is positioned in a cavity formed between the inner wall of the forward link, the rear flange of the forward link, and the inner surface of the second cylindrical portion of the forward wherein the front flange of each link includes: a first surface facing the outer wall of the link, and a second surface extending away from the first surface and simultaneously toward the central axis of the link; and wherein the rear flange of each link includes a third surface facing the inner wall of the link, and a fourth surface extending away from the third surface and simultaneously away from the central axis.

12. The protective covering system of claim 11, wherein when the adjacent links are coupled to one another, the adjacent links are movable axially relative to one another.

13. The protective covering system of claim 11, wherein the first surface and third surface are perpendicular to the central axis; and wherein the second surface and fourth surface are neither parallel nor perpendicular to the central axis.

14. The protective covering system of claim 13, wherein the insertion end of each link includes a first head wall parallel to the first surface;

wherein the receiving end of each link includes a second head wall parallel to the third surface; and wherein the first head wall of the rearward link is configured to abut the inner wall of the forward link during axial movement of the adjacent links relative to one another; and wherein the second head wall of the forward link is configured to abut the outer wall of the rearward link during axial movement of the adjacent links relative to one another.

15. The protective covering system of claim 11, wherein when the adjacent links are coupled to one another, the adjacent links are movable relative to one another from a first position in which their respective central axes are aligned to a second position in which their respective central axes are unaligned.

16. The protective covering system of claim 11, wherein the second cylindrical portion of each link includes a plurality of u-shaped cut-outs defined therein; and wherein each u-shaped cut-out opens toward the insertion end of the link.

17. A protective covering system for an optical fiber comprising:

a plurality of links that are coupleable together, wherein each link includes:
 a first cylindrical portion defined about a central axis, the first cylindrical portion including an receiving end of the link;
 a second cylindrical portion defined about the central axis, the second cylindrical portion including an insertion end of the link, wherein the second cylindrical portion has a lesser diameter than the first cylindrical portion;
 a base extending radially outwardly relative to the central axis from the second cylindrical portion to the first cylindrical portion, the base including an outer wall facing toward the insertion end of the link and an inner wall facing toward the receiving end of the link;
 a rear flange defined at the receiving end of the link and extending inwardly toward the central axis;
 a front flange defined at the insertion end of the link and extending outwardly away from the central axis;

wherein the front flange of each link includes: a first surface facing the outer wall, and a second surface extending away from the first surface and simultaneously toward the central axis of the link;

wherein the rear flange of each link includes a third surface facing the inner, and a fourth surface extending away from the third surface and simultaneously away from the central axis; and wherein, when adjacent links, including a forward link and a rearward link, of the plurality of links are coupled together:
 (i) the rear flange of the forward link is positioned axially between the outer wall of the rearward link and the front flange of the rearward link,
 (ii) the front flange of the rearward link is positioned axially between the inner wall of the forward link and the rear flange of the forward link.

18. The protective covering system of claim 17, wherein when the adjacent links are coupled to one another, the adjacent links are movable axially relative to one another.

19. The protective covering system of claim 17, wherein when the adjacent links are coupled to one another, the adjacent links are movable relative to one another from a first position in which their respective central axes are aligned to a second position in which their respective central axes are unaligned.

20. The protective covering system of claim 17, wherein the second cylindrical portion of each link includes a plurality of u-shaped cut-outs defined therein; and wherein each u-shaped cut-out opens toward the insertion end of the link.

* * * * *